United States Patent [19]

Vrenjak

[11] Patent Number: 5,063,523

[45] Date of Patent: Nov. 5, 1991

[54] NETWORK MANAGEMENT SYSTEM WITH EVENT RULE HANDLING

[75] Inventor: Milan J. Vrenjak, Coral Springs, Fla.

[73] Assignee: Racal Data Communications Inc., Sunrise, Fla.

[21] Appl. No.: 438,375

[22] Filed: Nov. 16, 1989

[51] Int. Cl.⁵ .................... G06F 15/16; G06F 13/42
[52] U.S. Cl. ...................................... 364/514; 395/200
[58] Field of Search .................. 364/514, 200, 900

[56] References Cited

U.S. PATENT DOCUMENTS

| | | | |
|---|---|---|---|
| 4,385,384 | 5/1983 | Rosbury et al. | 371/20.6 |
| 4,545,011 | 10/1985 | Lyon et al. | 364/200 |
| 4,660,141 | 4/1987 | Ceccon et al. | 364/200 |
| 4,733,351 | 3/1988 | Peirent | 364/200 |
| 4,851,997 | 7/1989 | Tatara | 364/200 |
| 4,855,905 | 8/1989 | Estrada et al. | 364/200 |
| 4,864,492 | 9/1989 | Blakely-Fogel et al. | 364/513 |
| 4,912,656 | 3/1990 | Cain et al. | 364/514 |
| 4,951,192 | 8/1990 | Chase, Jr. et al. | 364/200 |
| 4,974,181 | 9/1990 | Sinderson | 364/550 |
| 4,975,831 | 12/1990 | Nilsson et al. | 364/200 |
| 4,975,838 | 12/1990 | Mizuno et al. | 364/900 |

FOREIGN PATENT DOCUMENTS 0201308 11/1986 European Pat. Off. .
0260579 3/1988 European Pat. Off. .

OTHER PUBLICATIONS

Parsaye, K., *Expert Systems for Experts*, pp. 138-140 (1988).
"Understanding UNIX A Conceptual Guide", Groff & Weinberg, pp. 68-97 (1983).
Racal-Milgo's CMS 2000 Network Management System.

*Primary Examiner*—Joseph L. Dixon
*Attorney, Agent, or Firm*—Jerry A. Miller

[57] ABSTRACT

A data communication network management system allows a user to establish rules which are pattern matched to attributes of incoming events, such as alarms, from network objects. When a match is found, the network management system retrieves a user prepared command SCRIPT file and substitutes attributes from the event into the command SCRIPT. The command SCRIPT is then invoked to allow the user to program the system to automatically take predetermined actions upon the occurrence of network generated events specified by the user.

16 Claims, 3 Drawing Sheets

NETWORK MANAGEMENT SYSTEM WITH EVENT RULE HANDLING

BACKGROUND

1. Field of the Invention

This invention relates generally to the field of network management systems for data communications networks. More particularly, this invention relates to a method and apparatus for allowing a user to define functions or SCRIPTed operations to be performed upon receiving a network event and satisfying a set of criteria in the form of a rule.

2. Backqround of the Invention

Commercially available data communications network management systems have been used for a number of years to enable an operator to manage a large group of objects within a data network. Such objects include modems, multiplexers, i restoral devices, Digital Service Units (DSU's), encryption devices, packet switches, etc. An example of such a system is shown in U.S. Pat. No. 4,385,384 to Rosbury et al which is hereby incorporated by reference. Such network management systems typically allow a user to define certain information about the network in an integral database which is used in the network management function. It is typical for such databases to keep track of information such as location of the object, type of object, object id, and interconnection information relating to the object (i.e., what other objects are connected to the object in question).

The commercially available CMS 2000 ™ network management system produced by Racal-Milgo, Fort Lauderdale, Fla., operates on "alarms" received from objects in the network indicating that certain events or problems have taken place. It is desirable for the user of such a system to be able to automate responses to such alarms in a manner which might not be contemplated by the designer of the network management system. The present invention provides such a mechanism by allowing the user to establish rules with which the alarm events are compared. Upon satisfaction of such rules, predefined SCRIPTs of commands can then be executed to invoke predetermined processes.

SUMMARY OF THE INVENTION

It is an object of the present invention to provide an improved network management system having capabilities for applying user defined rules to network events such as alarm events received from network objects It is an advantage of the invention that any user defined rules can be established, the satisfaction of which automatically causes execution of a command SCRIPT.

These and other objects and advantages of the invention will become apparent to those skilled in the art upon consideration of the following description of the invention.

In one embodiment of the present invention, a computer based data communication network management system for allowing a user to define actions to be taken in the event of occurrence of a predetermined event within a data communication network includes a network interface receiving event messages from a network object situated in the data communication network, the event message containing an attribute. A rule table stores a user defined rule within the network management system. The attribute is compared with the rule upon receipt of the event to determine if the attribute and the rule match. A predetermined SCRIPT containing at least one command upon determination in the comparing means that the attribute matches the rule is then invoked and executed.

In another embodiment of a computer based data communication network management system according to the present invention, a method for establishing and using a rule to react to network events, includes the steps of:

a user defining a criterion associated with a network event upon occurrence of which an action will be taken;

a user defining a SCRIPT of commands to be invoked upon occurrence of events meeting the criterion;

receiving an event message from the network; in the computer based data communication network management system, comparing attributes of the event with the user defined criterion; and if the attributes match the user defined criteria, invoking the SCRIPT of commands.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
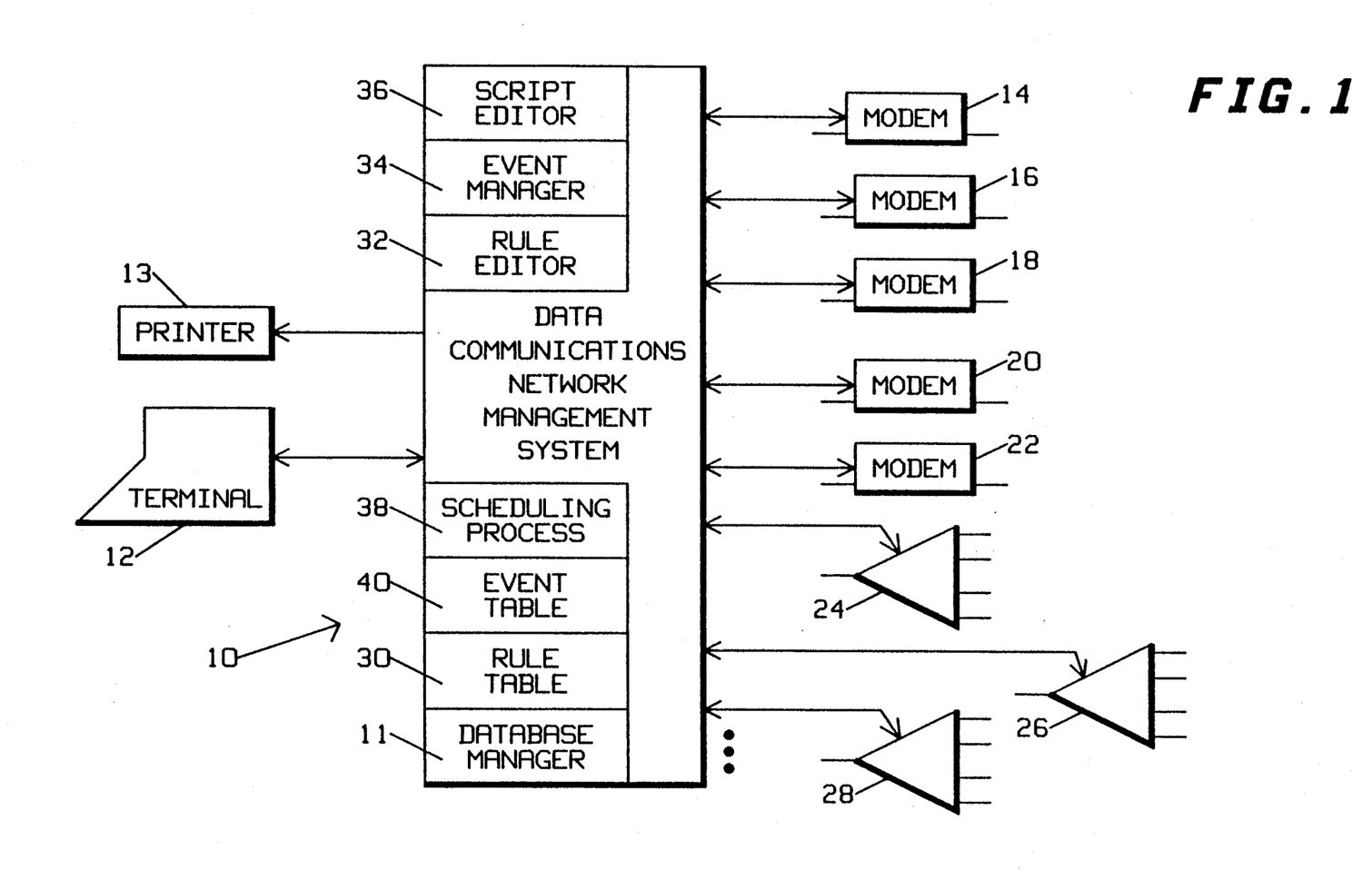
FIG. 1 shows a high level block diagram of a network management system.

Turning now to the drawing in which like reference numerals designate corresponding parts or functions throughout the several figures thereof, and in particular to FIG. 1 thereof, there is shown a network management system 10 having an integral database management system 11 such as the ORACLE ™ relational database management system produced by Oracle Corp. A user terminal 12 is attached to the system in a known manner to provide for a user interface to the system. A printer 13 may also be attached to the system to provide a log of activities. The network management system 10 may be based upon a minicomputer, microcomputer, workstation or other suitable host as is conventional and includes an operating system such as UNIX ™ as well as RAM memory and disk storage (not shown explicitly). In the preferred implementation, a DECstation 3100 ™ RISC workstation manufactured by Digital Equipment Corp. is used.

The network management system 10 is connected either directly or indirectly through communications channels to various network objects as previously described. This connection can be viewed conceptually for purposes of this disclosure as direct connections as shown. The objects shown in FIG. 1 correspond to a small set of network objects coupled to the network and include modems 14, 16, 18, 20 and 22; and multiplexers 24, 26 and 28. These objects are interconnected, in general with many other objects, in a data communication network which are not shown for simplicity. A large portion of the Network Management System 10 is devoted to data receipt and acquisition using known interfacing techniques such as those described in more detail in the Rosbury et al. patent.

The present invention also includes a Rule Table 30 forming part of database 11 which stores a plurality of rules created by the user as will be described herein. The Network Management System 10 also includes a Rule Editor 32 which is used to permit the user to create a rule and an Event Manager 34 which receives and manages incoming alarms and other events from the various network objects such as 14-28. A SCRIPT Editor 36 is used to create various SCRIPT files to be executed as will be described. SCRIPT editor 36 is simply a text editor. A Scheduling process 38 schedules the various SCRIPTed operations invoked upon satisfaction of a rule. An Event Table 40 provides a list of valid event codes and is available to the user in the form of a hard copy or may be made available from the terminal 12.

The user of the network management system 10 may communicate via terminal 12 with the various modems, multiplexers and in general other network objects (sometimes referred to herein as units) in order to obtain status or functional information, to attempt to locate malfunctions, to switch in redundant equipment and in general monitor the state of the network. In the preferred embodiment, the network objects communicate with the network management system 10 via an out of band secondary channel, but this is not to be limiting. Similarly, in the preferred embodiment, network or network object malfunctions are frequently reported to the network management system 10 via alarm events (messages) having a plurality of attributes which are transmitted via the secondary channel to the network management system 10. In general, asynchronous alarms as well as polled responses may be considered events in the present system. In other systems, in-band or out-of-band secondary channels may used and alarm type information may be conveyed by answering polls or by using other protocols. Such equivalent schemes may be readily adapted to use the present invention by those skilled in the art.

The Event Rule Handling feature of the present invention provides the user with the capability to manage rules that will be used by the Event Manager 34 to selectively initiate some action. For purposes of this document, an event is defined as a change of state of an object(s) caused by some activity performed or detected by the network management system 10 at a given instant of time. An event is characterized by the following:

An Event Class and Code, where the Event Class defines a common category of events and the Event Code defines a specific instance of an event within a class.

Objects associated with the event including the object name and its type. There may be single or multiple objects that may be involved in the event such as modems, multiplexers, etc. or abstractions of such objects such as sites (all such objects at the site) or domains (all objects in a particular domain).

Time the event was detected.

Additional data further characterizing the event, such as, status, alarm levels and so on.

The event attributes are formatted into text for the user by the Event Manager 34. A list of valid events and their descriptions is maintained as part of the configuration of the network management system within the Event Table 40. The allowable Event Classes and Codes are made available through the system documentation such as a user manual or release notes. An alternative could visually display the Event Table 40 to the user by entering an appropriate command (e.g. a soft function key or the like).

For purposes of this document, an "event rule" defines the selection criteria for a given incoming event and an action that is to be performed when a match is made. A match is made when the values of the attributes making up the event matches the selection criteria given. Matches may be determined using pattern matching techniques similar to those used by word processors for search and replace functions in the preferred embodiment. Selection criteria are applied individually over each incoming event, i.e., no integration of events is done in the preferred embodiment. An incoming event message may match many event rules resulting in many actions to be taken. Such actions are scheduled to be performed by the scheduling process 38.

A rule is made up of a set of criteria defined by the user. Each criterion can select for a specific value or range of values for a single event attribute. Event attributes can be grouped into two classes: those that are common to all events, and those that are specific to an individual event type. The class of common event attributes of the preferred embodiments consists of the following event attributes: Event Class, Event Code, Date, Time, Object id, and Object Type.

Event specific attributes are those attributes that further describe a particular event. An example of a specific event attribute would be the alarm status, such as detected or canceled. The specification of multiple criteria, collectively define a rule that can select for an event or range of events that can initiate some action.

The present invention allows the user to specify selection criteria from a subset of the class of event attributes. This subset includes the main selection criteria —Event Class and Event Code, and the additional selection criteria—any three other event attributes connected together by the logical operator AND or OR in the present embodiment. In other embodiments, more or less than three other event attributes may be permitted.

In addition to defining the criteria for selecting an event, the user must associate an action to be performed when the rule is satisfied. The action performed will be the initiation of a predefined command file (SCRIPT) for additional processing. The term Command LIST or CLIST (IBM ™ terminology) is sometimes used for command files instead of the UNIX term SCRIPT. In either case, the file is simply a string of commands which can be executed on the network management system 10, similar to a DOS Batch file, which is executed when the rule is satisfied. A SCRIPT file may contain a number of predefined features specifically suited to managing an event and the user's network. Therefore, a sophisticated user can automate many of the activities that are performed to evaluate an event, eliminating much of the routine manual effort normally associated with these activities.

The task of monitoring events, applying the rules, and initiating the SCRIPT files, is performed by the Event Manager 34. In the preferred embodiment, the types of function associated with rules fall into 4 generic classes; definition of a new rule, display of an existing rule(s), modification of an existing rule, and deletion of an existing rule.

There are two operational modes associated with the present invention: rule definition and operation. In the rule definition mode, as described in connection with FIG. 2, while the system operation mode is described in connection with FIG. 3.

Figure 2:
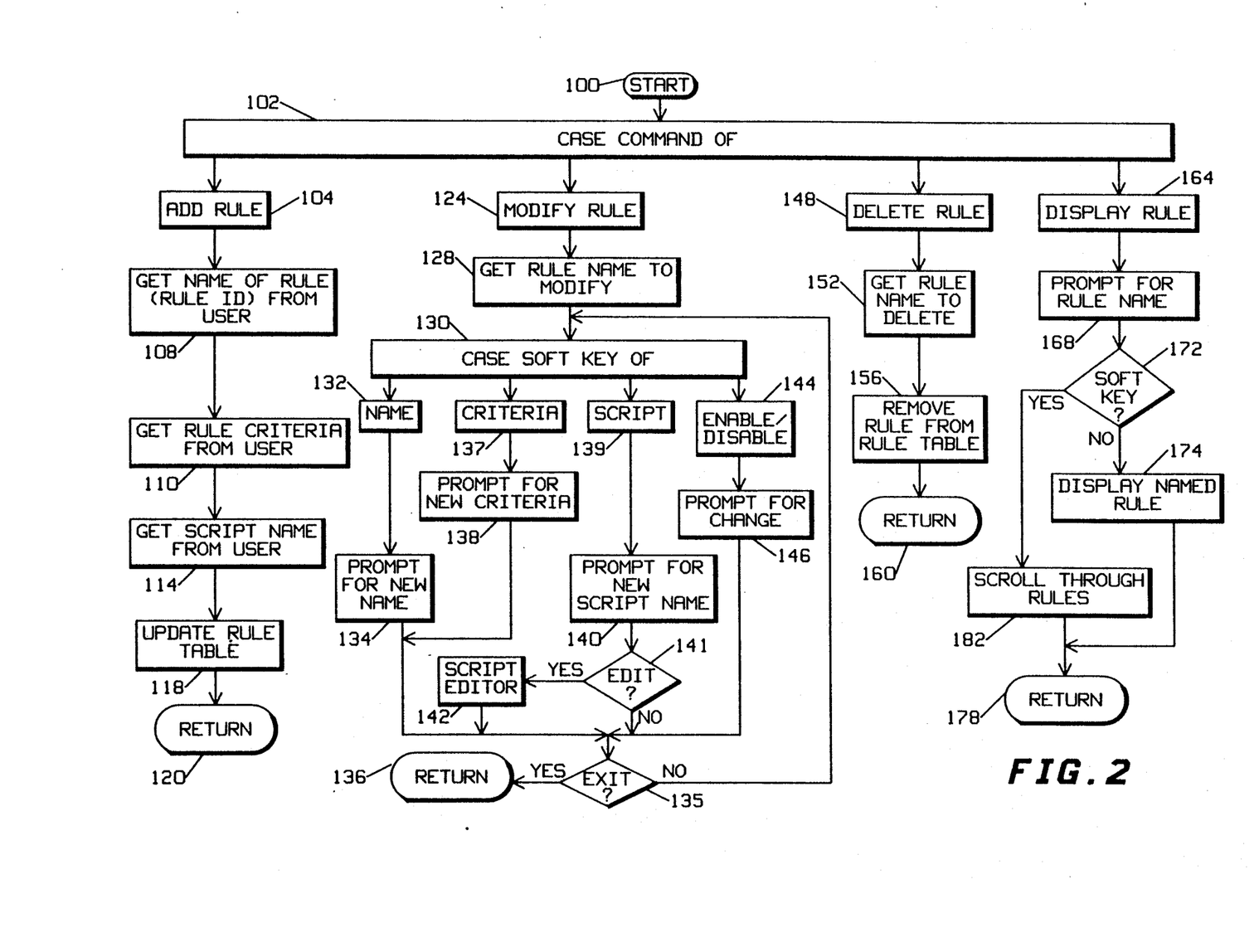
FIG. 2 shows a flow chart of the rule definition mode of the present invention.

Turning now to FIG. 2, the rule definition mode is described. The process begins at 100 where a user command is awaited. When a command is received, a case function is performed at 102. The rule definition features can be invoked by using the following commands: ADD RUL, MOD RUL, DEL RUL, DIS RUL and EVE RUL. EVE RUL is a general entry point to the other 4 specific features (e.g. a command executed from a higher level menu) and is not shown in the drawing for simplicity. Those skilled in the art will appreciate that further specific editing commands can also be implemented such as a copy rule command which would copy an existing rule so that it can be modified to create a new rule.

The Add Rule function 104 provides the user with the ability to define new rules and associate them with a specific action. In order to define a new rule, the user is required to provide a rule identifier at 108 which must be unique among the rules created by that user. The user chooses the Add Rule function 104 by entering ADD RUL on the command line. The rule identifier (rule id) serves as a key to the rule and aids the user in managing the rules that he or she has defined. At 108 the user is prompted to supply a rule name (rule id) to be created. The first step to defining a rule will be the specification of a rule id at 108. The rule id can be any combination of, for example, twelve alphanumeric characters and must be unique among the rules defined by this user.

After defining the rule criteria at 110, the user can associate an action with the rule. This is done by supplying the name of a SCRIPT at 114 that is to be executed whenever an event meets the previously defined criteria. In addition to specifying the SCRIPT name, the user is asked to specify what event parameters are to be passed to the SCRIPT, and the order in which they are to be passed to the SCRIPT at 114. When the user has completed entry of the rule in steps 108, 110 and 114, the rule table 30 is updated at 118 and the proces s returns to await another command.

As described above, the process of adding a new rule is broken up into two distinct parts; the rule criteria definition, and specification of the SCRIPT and associated parameters. A criteria definition screen is displayed first. The Add Rule function then allows the user to specify the criteria that will make up the new rule at 110. Following the entry of a rule id, the definition of a new rule will continue with the specification of the main selection criteria —Event Class plus a logical expression defining specific Event Codes for the Event Class.

By defining multiple criteria for a rule, the user can make the rule have a very narrow focus in order to select for a very specific event. Alternatively, by specifying wide value ranges, the rule can be made to apply to wide range of different events.

In order to further understand how a rule is created in the preferred implementation, it may be helpful to study the details of criterion input for the preferred implementation. In other implementations, more flexible expression of criteria may be devised. In the preferred embodiment, the user is prompted of the Event Class that defines the category of events to select from. Only one Event Class can be specified in the preferred embodiment. This is presented to the user with an implicit equals sign (=) to indicate only one Event Class can be selected. The operand entered should correspond to a valid event within the Event Table 40.

For example, the user could define a rule for a specific Event Class in the following manner:

EVENT CLASS: =0600

In this example, the user has specified that the rule applies to only those events that have an Event Class of 0600. The particular codes that are used to relate to an event class are, of course, system dependent and not to be limiting. in this case an Event Class of 0600 might represent network alarm events.

The Event Code name is followed by an operator field in the same fashion as the Event Class input example. This field permits entry of a two digit relational operator which can be one of the following; an equals sign (=), a not equals operator (!=), a greater than (>), a less than (>), a greater than or equal to (>=), or a less than or equal to (<=). Following the specification of the operator, the next field will specify the operand. The operand field is used to specify a target value for selection. Example:

EVENT CODE: = 0004 ___ __ ___

In the example, the user has specified that the rule applies to only those events that have an Event Code of 0004 which might represent, for example, a received line fault (RLF) alarm (assuming event class 600).

The second operator field is optional and is provided for the user to specify a range of values for the criteria. This field will accept one of two possible entries; either an AND, or an OR. The remaining two fields are provided for the definition of a second operator and operand. For example, the user could define a rules for a range of event codes in the following manner.

Example:

EVENT CODE: >=0004 AND <=0035

In This example, the user has specified that the rule applies to only those events that have an Event Code between 0004 and 0035 inclusive.

The user can specify additional selection criteria based on the event attributes of the logged messages selected by the main selection criteria of Event Class and Event Code. The user can also express the relationship between the event attributes by using the AND, OR logical operators. Only a maximum of, for example, three event attributes might be permitted in some embodiments The allowable event attribute types to specify additional selection criteria are based on the common attributes of all events that may match based on the main selection criteria. For example, class 600 and codes 3–6 might refer to the events listed in the following TABLE 1:

TABLE 1

| EVENT CODE | DESCRIPTION |
|---|---|
| 003 | STR - STReaming primary channel |
| 004 | RLF - Received Line Fault |
| 005 | MPF - Modem Power Fail |

TABLE 1-continued

| EVENT CODE | DESCRIPTION |
| --- | --- |
| 006 | DNR - Dedicated line Not Restored |

These events have the common attributes TIME, UNIT, COMPONENT, SITE, DOMAIN and STATUS. The common attributes for the main selection criteria are displayed when specifying the additional selection criteria.

Entry of the additional selection criteria definition is then prompted. The user can use the relational operator (=, !=, IN) while the logical operators are restricted to (AND, OR). If the "IN" relational operator is used, the suggested value to be used in conjunction with it should be SET n where n can take values from 0 to 9. The system, on seeing an IN operator being used, would prompt for the definition of the appropriate SET. Those skilled in the art will appreciate that more advanced embodiments can be devised to expand on this aspect.

A set is made up of a number of valid objects within the object type associated with the set. The types can be restricted to the class of event attributes. A system limit of, for example, 28 members in a set can be imposed.

Once all the selection criteria have been defined and validated, the user is given the opportunity to associate a SCRIPT with the rule. This is done by prompting the user for the name of the SCRIPT that is to be executed upon successful acquisition of an event that meets the currently defined rule. No checking will be performed to insure that the specified SCRIPT actually exists until the rule is enabled in the preferred embodiment. This allows the user to define a rule before creating a SCRIPT.

The next step is the specification of the arguments and the order in which they are passed to the SCRIPT. Entry of the arguments takes place through the ARGUMENTS: prompt. Each of the arguments should be separated by a space and entered in the order in which they are to be passed to the SCRIPT in the preferred implementation. A list of the common event attributes is listed below the prompt to assist in the entry of the arguments. After completing the entry of the argument list the system will parse the information and display the argument count.

The next step allows the user to enable or disable the rule. When a rule is enabled that means the Event Manager will read that rule from the rule table and code it and use that rule to match against incoming events. When it is disabled the Event Manager deletes it from its memory and will not match against it. The default condition will be rule disabled. If the user saves the rule in a disabled condition, it will be stored in the database but no event rule matching will be done. If the user selects to enable a rule the following criteria must be met before allowing it to be enabled.

1. The SCRIPT must be defined
2. The SCRIPT association must be Valid. No errors in arguments.
3. Any sets defined cannot be empty.
4. The selection criteria must have a valid pattern.

Once all the rule attributes are defined, the rules are saved by the system in rule table 30.

A rule can be defined without being activated. This will allow the user to maintain a library of rules that can be enabled and disabled at will. The system will keep track of the date and times a rule was created, last modified, and enabled/disabled in the preferred implementation. Enabled rules will be reactivated after the network management system has been stopped and restarted.

The following example shows the definition of an event rule's selection criteria and action in a realistic setting. In this example, portions of the screen displays are illustrated.

First in this example, the main selection criteria is defined to select all alarm events (class 600) that have code 003 (received line faults). This class and code are known to the user through the Event Table 40 which the user can view for reference by hard copy or by pressing an appropriate soft function key.

MAIN SELECTION CRITERIA

```
                     class         <,=,!=,> code  AND,OR  <,=,!=,> code
        EVENT CLASS : 600  EVENT CODE:  =     003        __    _    __
```

The following additional selection criteria is applied. The alarm event must have a status of 'detected' and must be within a specific site—'MIAMI' and a domain 'BEACH'. Note that the common event attributes for the above main selection criteria are shown with the prompt.

ADDITIONAL SELECTION CRITERIA

```
         type  =,!=,IN   Value,SETn    AND,OR
STATUS____    =          detected____  AND
SITE______    =          MIAMI____     AND
DOMAIN____    =          BEACH____
```

Common Event Attributes:
UNIT SITE DOMAIN STATUS UNIT_TYPE

The following SCRIPT association specifies a SCRIPT to carry out an intended restoral action on the unit specified within the alarm event. Note that the available event attributes to pass to the script are shown and that only the unit needs to be passed to perform the intended operation.

```
ASSOCIATED SCRIPT SPECIFICATION
   SCRIPT NAME:    dial_backup---
   ARGUMENTS  :  UNIT_____________________
Available Event Attributes:
UNIT SITE DOMAIN STATUS
```

The script dial_backup could contain the following line to put the unit detected by the event into dial backup and thus restore communication to the network. The variable $1 will be substituted with the unit detected by the event.

DIAL BACKUP UNIT=$1

Finally, the user can enable or disable the event by putting the cursor over 'YES' or 'NO' as shown below.

```
RULE ACTIVITY STATUS
   ENABLE RULE:    NO      [YES]
```

The Modify Rule function 124 allows the user to modify existing rules. The rules that can be modified may be limited to those that are defined by that user in the preferred embodiment. The user can select a particular rule for potential modification by entering its associated rule id at step 128. Upon entry of the rule id, the user can view the rule that is being modified. In the preferred embodiment, the system maintained attributes of the rule such as the date and time the rule was created, last modified, etc. will not be displayed since they cannot be modified by the user.

The rule modification process proceeds to step 130 where the user selects a soft programmed function key representing the modification process he wishes to use. If the user wishes to modify the name of the rule, he selects soft key 132 after which the system prompts him for a new rule name at 134. The user may then exit at 135 and the process returns at 136. If the user does not wish to exit modify rule, control returns to 130.

If the user elects to change the rule criteria by selecting 137, he is prompted for the new criteria at 138 and then control passes to 135. If the user selects to modify the SCRIPT at 139, he is allowed to change the SCRIPT name at 140. If he wishes to edit the SCRIPT at 141, control passes to the SCRIPT editor at 142 after which the user can exit at 135 if desired. The user may also elect to change the rule status (enabled or disabled) at 144. If so elected, the system prompts for a change at 146 and then control passes to 135. In the preferred embodiment, an escape key or the like can be used at any point to move the user back to a higher level operation at any time in a known manner. Each change is individually made to the database when the user enters the change.

In operation, the user chooses the Modify function by entering MOD RUL on the command line. For security reasons, it is preferred that the system only permit a user to modify rules created by that user. Other methods of invoking the function such as pointing to a menu selection using a pointing device such as a mouse may also be used in alternative embodiments. In order to modify a pre-existing rule, the target rule must be first be chosen. This can be done by entering a valid rule id at 128. Only the user definable attributes of a rule can be modified and system maintained attributes such as creation date, modified date, and so on, cannot be modified by the user.

All the input fields will contain the values that are currently defined. The user may choose to modify certain values and retain others by skipping over them. The rule must first be disabled, in order to modify any of the rule characteristics apart from the rule id. In the preferred embodiment, the user can use a soft function key to modify the respective rule attribute. Available soft function keys in the preferred embodiment are "MODIFY ACT STAT" to enable/disable rule, "MODIFY SCRIPT" to change the associated SCRIPT and its arguments, "MODIFY MAIN SEL" to change the event class and code criteria, "MODIFY ADD SEL" to change the logical expression, "MODIFY RULE ID" to rename the rule and "MODIFY SETS" to alter the contents of the sets. Valid changes are saved as they are made and a status message "CHANGES SAVED TO DATABASE" is displayed.

After the "MODIFY RULE ID" is pressed and the rule is renamed, the feature will exit and return to the first screen for MODIFY RULE with the name of the new rule displayed for the rule id prompt.

The user can elect to change any or all of the rule criteria and may also change the associated SCRIPT name and its associated arguments using the SCRIPT editor 36. The user may also rename the rule. None of the changes made by the user are effective until the user saves the changes. If the user elects to update the rule the system keeps track of the date and time of the modification.

It is important to note that the Modify Rule function provides the sole means of enabling and disabling rules once they have been added in the present embodiment, but this is not to be limiting. When it is desired to effect a change of the enabled/disabled state of a rule the user updates the enabled/disabled attribute of the rule to 'enabled' for the rule change to become effective.

In the preferred implementation, the user has the capability to disable and enable event rules on a scheduled basis. This is accomplished with the scheduling process 38. For example,, the user may wish to turn off a rule during off hours and on when the system is managed. Or, for another example, it may be desirable to turn off a rule which requires substantial computing power during peak hours of system activity. This could be accomplished by modifying a rule using the modify rule process with the following arguments:

MOD RUL RULE_ID=xyz_rule
        ENABLE=NO which will turn off the rule at some time specified in the scheduling feature.

The Delete Rule function 148 allows the user to delete existing rules. For security reasons, the rules that can be deleted are preferably be limited to those that are defined by that user. The user can select a particular rules for potential deletion by entering its associated rule id at 152. In alternative embodiments, the user may select the rule name from a list by using a pointing device such as a mouse or the like. The rule selected for deletion can be viewed at 152 before the deletion is confirmed by the user and carried out by the system. When the user elects to delete a specific rule, the request is first confirmed before the actual deletion takes place. This will alleviate the possibility that a user could inadvertently delete a rule. After receiving confirmation from the user the rule is then removed from the rule table at 156 and the process returns at 160.

The user chooses the Delete Rule function by entering DEL RUL on the command line, or by equivalent means. In order to delete an existing rule, the user enters the rule id of the target rule. Once the rule id is specified, the user is prompted for confirmation of deletion. The rule information is also displayed at the same time.

If the user confirms the deletion query, by selecting 'YES', the rule will be deleted. If the user chooses 'NO' then the previous screen is redisplayed. The confirmation prompt will have a default value of 'NO' to help prevent accidental deletions.

The Display Rule function 164 allows the user to display previously defined rules. The user can select to display a particular rule by entering its associated rule id at 168. The named rule is then displayed at 174 and the process returns at 178. When displaying a specific rule, the format of the display is analogous to the Modify Rule function except that several system maintained fields will be displayed along with the user defined data. This function provides for display only, no changes can be made through this function.

Alternatively, the user can scroll through the rules, viewing them one at a time by pressing an appropriate soft key (a software defined function key) from the console at 172. The scrolling process is then initiated at 182. When scrolling through the rules the operator can select to view all defined rules or only rules defined by that user.

The user chooses the Display Rule function by entering DIS RUL on the command line. There are two methods of displaying existing rules in the preferred embodiment. In the first method the user can display a specific rule by entering it's rule id. Once the rule id has been entered, the rule will be displayed in formatted fields.

In the second method of rule display, the user utilizes NEXT PAGE and PREVIOUS PAGE hard keys to page through rules. The rules are displayed in a terse format with only the very basic information displayed. Thus more than one rule can be viewed at the same time. When scrolling through rules the user can select to view all the rules in the rule table or only those he or she has defined.

When the Display Rule function is first invoked the user is prompted for the rule id of the rule to be displayed. Also active are two soft function keys "DISPLAY USER DEF" and "DISPLAY ALL" which allow the user to view all the user defined rules or all the rules in the system, in a scrolling form. The current state of the scope of view is displayed at the top of the window.

When displaying a rule, the first screen presented to the user displays the rule criteria as well as the system maintained data. The system maintained data includes Creation Date, Date Last Modified, Enabled Date and User Id. These fields will be displayed near the top of a window on the screen of terminal 12.

The SCRIPT association data is also displayed on the same page/screen. When viewing the criteria display screen, the constituents of sets, if any, can be viewed by using a "DISPLAY SETS" soft function key and specifying the set id. The NEXT PAGE and PREVIOUS PAGE hard keys can be used to page through the set members.

All four of the above functions can be invoked by entering EVE RUL on the command line in the preferred embodiment. This leads to a function key selection screen whereby the user can select the appropriate feature. In other embodiments, soft keys, drop down menus or windows, or other devices may be used to access the commands.

Figure 3:
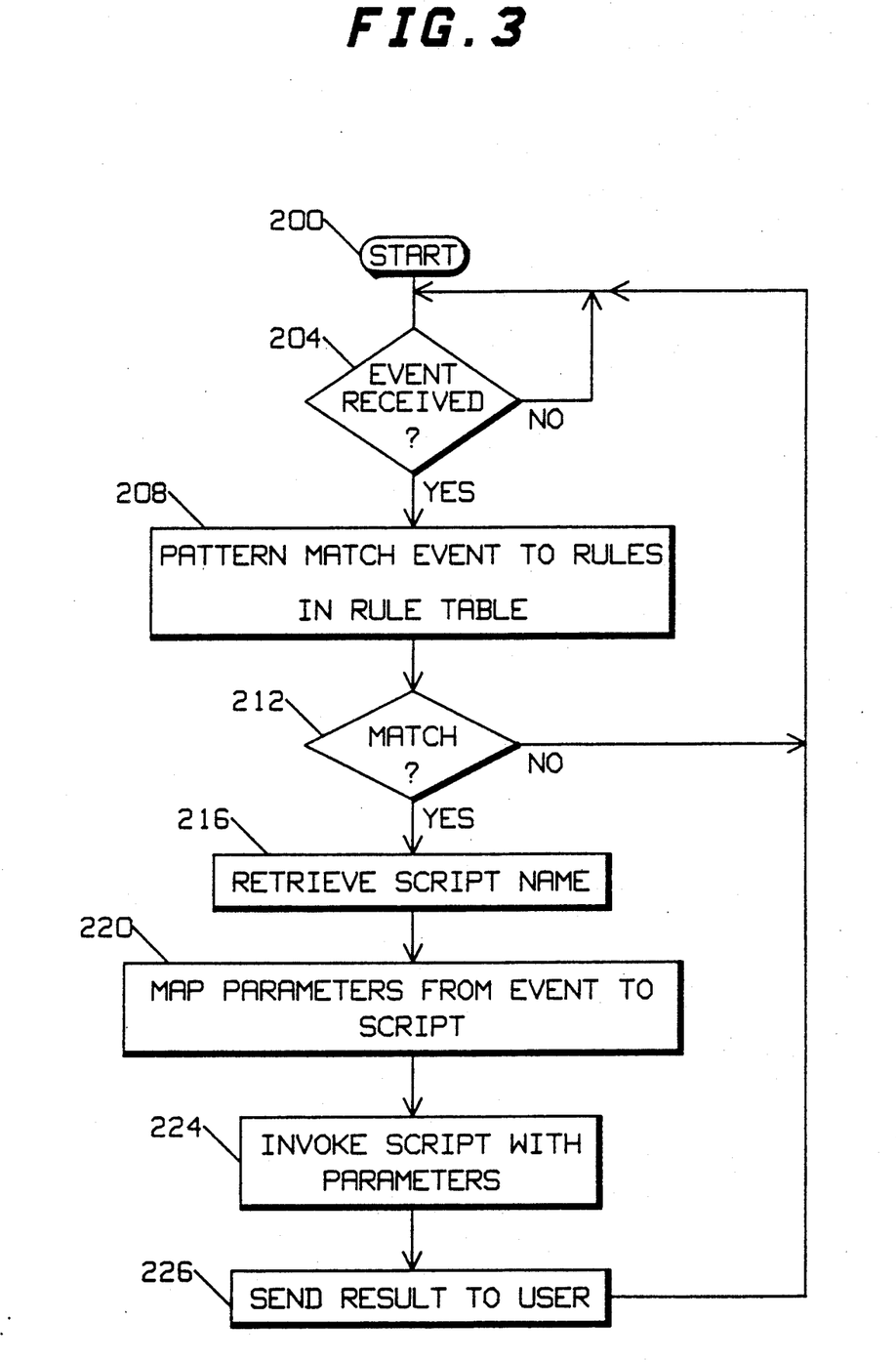
FIG. 3 shows a flow chart of the event rule handling system operation.

Turning now to FIG. 3, the system operation mode is described. The process starts at 200 after which control passes to 204 where the receipt of an event is monitored. If an event has been received at 204, a pattern match is performed on the attributes of the received event to compare these attributes with each rule in the rule table 30. If no match is found at 212, control returns to 204. If a match is found, the event manager 34 retrieves the name of the SCRIPT to be executed at 216. At 220, the parameters from the event are mapped to the appropriate variables in the SCRIPT and the SCRIPT is invoked at 224. The results of the SCRIPTed operation are then sent to the user at 226. In the preferred embodiment, this is accomplished by writing the results to a file and sending the user a message telling him to look at the file to obtain the results of the SCRIPTed operation. The message can be in a form similar to conventional E-mail type functions. Control then returns to 204 where the next event is awaited.

With reference to the flow charts described above, it will be understood by those skilled in the art that error trapping has not been described so that the invention can be readily understood without undue burden of known error trapping techniques. Those skilled in the art will understand how to use such error trapping techniques as required to attempt to assure that only valid entries are made and the like. In most instances of rule entry and the like, the user can leave a procedure to get to the next higher level by use of an exit key or escape key, the status of which is continually monitored by the system. Other escape mechanisms can be implemented in alternative embodiments without departing from the present invention.

In an advanced embodiment of the present invention, the system designer can utilize the present invention to update internal processes. For example, suppose the user has a window defined to display a map of the network. If modem 14 sends an alarm to the network management system 10, the system designer may wish the map to be updated to reflect this alarm (e.g. change color of modem 14 on the map). In this case, a rule can be established which passes the alarm information to the system process which generates the map display. Other variations of such rules will occur to those skilled in the art.

Thus it is apparent that in accordance with the present invention, an improved apparatus and method that fully satisfies the objectives, aims and advantages is set forth above. While the invention has been described in conjunction with specific embodiments, it is evident that many alternatives, variations, modifications and permutations will become apparent to those skilled in the art in light of the foregoing description. Accordingly, it is intended that the present invention embrace all such alternatives, variations, modifications and permutations as fall within the spirit and broad scope of the appended claims.

What is claimed as new is:

1. A computer based network management system for managing a data communication network, said network management system having been developed by a designer to operate in a predetermined normal manner for use by a network management system user, comprising in combination:

receiving means for receiving an event message from a network object situated in said data communication network, said event message reporting an event within said data communication network and containing an attribute;

storing means for storing a user defined rule within said network management system said user defined rule being a rule added to said network management system by said user to customize said predetermined normal manner of operation of said network management system;

comparing means for comparing said attribute with said rule upon receipt of said event message to determine if said attribute and said rule match; and invoking means for invoking a predetermined SCRIPT containing at least one command upon determination in said comparing means that said attribute matches said rule.

2. The apparatus of claim 1, further comprising means for editing said rule.

3. The apparatus of claim 1, wherein said comparing means includes pattern matching means for determining if a character pattern in said rule matches a character pattern in said attribute.

4. The apparatus of claim 1, wherein said SCRIPT is stored in a SCRIPT file.

5. The apparatus of claim 4, further comprising means for editing said SCRIPT file.

6. The apparatus of claim 1, wherein said storing means includes means for storing a plurality of user defined rules.

7. The apparatus of claim 6, wherein said comparing means includes means for comparing said attribute with each rule stored in said storing means until either said match is found or it is determined that no match exists.

8. A method for establishing and using a rule to react to a network event occurring in a data communication network, comprising in combination the steps of:
- a network management system user defining a criterion associated with said network event upon occurrence of which an action will be taken;
- a network management system user defining a SCRIPT of commands to be invoked upon occurrence of said event meeting said criterion in order to produce said action;
- receiving an event message from an object in said network;
- in a computer based data communication network management system, said network management system having been developed by a designer to operate in a predetermined normal manner for use by said network management system user, comparing attributes of said event message with said user defined criterion; and
- if said attributes match said user defined criterion, invoking said SCRIPT of commands to effect customized operation of said predetermined normal manner of operation of network management system.

9. The method of claim 8, wherein said invoking step comprises determining a name of said SCRIPT and retrieving said SCRIPT.

10. The method of claim 8, further comprising supplying information relating to said event message for substitution within said SCRIPT.

11. The method of claim 8, further comprising the step of storing said criterion in said computer based data communication network management system.

12. The method of claim 8, further cmoprising the step of storing said SCRIPT of commands in said computer based data communication network management system.

13. The method of claim 8, wherein said comparing step is carried out by determining if a character pattern in said criterion matches a character pattern in said event message.

14. The method of claim 8, further comprising the step of editing said SCRIPT.

15. The method of claim 11, wherein said storing step includes storing said criterion in a storing means, and wherein said storing means stores a plurality of user defined criteria.

16. The method of claim 11, wherein said storing step includes storing said SCRIPT of commands in a storing means, and wherein said storing means stores a plurality of said SCRIPTS of commands.

* * * * *